US008966447B2

(12) United States Patent
Hoke et al.

(10) Patent No.: US 8,966,447 B2
(45) Date of Patent: Feb. 24, 2015

(54) CAPTURING AND DISPLAYING STATE OF AUTOMATED USER-LEVEL TESTING OF A GRAPHICAL USER INTERFACE APPLICATION

(75) Inventors: Evan M. Hoke, Milpitas, CA (US); Patrick R. Holley, Santa Clara, CA (US); Jonathan M. Deutsch, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 418 days.

(21) Appl. No.: 13/164,694

(22) Filed: Jun. 20, 2011

(65) Prior Publication Data
US 2011/0314343 A1 Dec. 22, 2011

(51) Int. Cl.
G06F 9/44 (2006.01)
G06F 11/36 (2006.01)

(52) U.S. Cl.
CPC ........ G06F 11/3696 (2013.01); G06F 11/3672 (2013.01)
USPC ............................ 717/124; 717/134; 717/135

(58) Field of Classification Search
None
See application file for complete search history.

(56) References Cited

U.S. PATENT DOCUMENTS

| | | | | |
|---|---|---|---|---|
| 5,475,843 | A * | 12/1995 | Halviatti et al. | 717/124 |
| 5,657,438 | A * | 8/1997 | Wygodny et al. | 714/1 |
| 5,732,277 | A * | 3/1998 | Kodosky et al. | 717/134 |
| 5,781,720 | A * | 7/1998 | Parker et al. | 714/38.11 |
| 6,237,138 | B1 * | 5/2001 | Hameluck et al. | 717/128 |
| 6,332,212 | B1 * | 12/2001 | Organ et al. | 717/128 |
| 6,493,868 | B1 * | 12/2002 | DaSilva et al. | 717/105 |
| 6,769,054 | B1 * | 7/2004 | Sahin et al. | 717/124 |
| 7,020,573 | B2 * | 3/2006 | Wheeler et al. | 702/121 |
| 7,184,918 | B2 * | 2/2007 | Hamilton et al. | 702/120 |
| 7,213,113 | B2 * | 5/2007 | Sahin et a | 717/124 |
| 7,310,777 | B2 * | 12/2007 | Cirne | 715/763 |
| 7,343,563 | B2 | 3/2008 | Muratori et al. | |
| 7,444,574 | B2 * | 10/2008 | Davis et al. | 717/134 |
| 7,478,365 | B2 * | 1/2009 | West et al. | 717/124 |
| 7,496,627 | B2 * | 2/2009 | Moorer et al. | 709/204 |
| 7,653,896 | B2 * | 1/2010 | Herdeg, III | 717/113 |
| 7,698,686 | B2 | 4/2010 | Carroll et al. | |

(Continued)

OTHER PUBLICATIONS

Johnson, et al., "Composable Multi-Level Debugging with Stackdb", 2014 ACM; [retrieved on Oct. 26, 2014]; Retrieved from Internet <URL:http://dl.acm.org/citation.cfm?id=2576195>;pp. 213-225.*

Pradel, et al., "EventBreak Analyzing the Responsiveness of User Interfaces through Performance-Guided Test Generation"; 2014 ACM; [retrieved on Oct. 26, 2014]; Retrieved from Internet <URL:http://dl.acm.org/citation.cfm?id=2660193>;pp. 33-47.*

(Continued)

*Primary Examiner* — Xi D Chen
(74) *Attorney, Agent, or Firm* — Novak Druce Connolly Bove + Quigg LLP

(57) ABSTRACT

In one embodiment, an automated user-level testing tool is enhanced to capture additional information about the state of the automated testing, beyond just a screenshot of the application-under-test. In another embodiment, an automated user-level testing tool is enhanced to capture testing state information for multiple points in time (referred to as "snapshots"), beyond just when the application-under-test crashes. This captured information from one execution of an automated test (one "test run") is stored in one test log, which can then be viewed using a test log viewer. In one embodiment, the graphical user interface (GUI) for the test log viewer includes four areas: a screenshot area, a test script area, a stack trace area, and a timing area. The content shown in the screenshot area, the test script area, and the stack trace area is specific to a particular point in time during a test (e.g., a particular snapshot).

20 Claims, 20 Drawing Sheets

(56) References Cited

U.S. PATENT DOCUMENTS

| | | | |
|---|---|---|---|
| 7,702,958 B2* | 4/2010 | Kwong et al. | 717/124 |
| 7,818,754 B2* | 10/2010 | Morris et al. | 719/318 |
| 7,840,851 B2 | 11/2010 | Hayutin | |
| 7,870,431 B2* | 1/2011 | Cirne et al. | 714/45 |
| 7,877,642 B2* | 1/2011 | Ding et al. | 717/133 |
| 8,001,529 B2* | 8/2011 | Babut et al. | 717/124 |
| 8,019,588 B1* | 9/2011 | Wohlberg et al. | 717/134 |
| 8,032,868 B2* | 10/2011 | Bates et al. | 717/128 |
| 8,046,747 B2* | 10/2011 | Cyr et al. | 717/135 |
| 8,239,831 B2* | 8/2012 | Brennan et al. | 717/124 |
| 8,271,950 B2* | 9/2012 | Bharadwaj | 717/124 |
| 8,271,962 B2* | 9/2012 | Muller | 717/134 |
| 8,392,887 B2* | 3/2013 | Nagle | 717/135 |
| 8,402,318 B2* | 3/2013 | Nieh et al. | 717/124 |
| 8,429,613 B2* | 4/2013 | Rosen | 717/124 |
| 8,527,941 B2* | 9/2013 | Clark | 717/135 |
| 2003/0121027 A1* | 6/2003 | Hines | 717/135 |
| 2004/0111708 A1* | 6/2004 | Calder et al. | 717/135 |
| 2005/0188357 A1* | 8/2005 | Derks et al. | 717/124 |
| 2005/0278728 A1* | 12/2005 | Klementiev | 719/328 |
| 2006/0026467 A1* | 2/2006 | Nehab et al. | 714/38 |
| 2006/0212324 A1* | 9/2006 | Okman et al. | 705/7 |
| 2007/0044078 A1* | 2/2007 | Cifra | 717/135 |
| 2007/0234293 A1* | 10/2007 | Noller et al. | 717/124 |
| 2008/0301651 A1* | 12/2008 | Seneski et al. | 717/135 |
| 2009/0125890 A1* | 5/2009 | Bennet et al. | 717/129 |
| 2009/0150868 A1 | 6/2009 | Chakra et al. | |
| 2010/0088683 A1* | 4/2010 | Golender et al. | 717/128 |
| 2010/0318312 A1* | 12/2010 | Bhat et al. | 702/108 |

OTHER PUBLICATIONS

Efroni, et al., "Reactive Animation: Realistic Modeling of Complex Dynamic Systems"; 2005 IEEE;[retrieved on Oct. 26, 2014]; Retrieved from Internet <URL:http://ieeexplore.ieee.org/stamp/stamp.jsp?tp=&arnumber=1381254>;pp. 38-47.*

Nagowah, Doorgah, "Improving Test Data Management in Record and Playback Testing Tools", 2012 IEEE;[retrieved on Oct. 26, 2014]; Retrieved from Internet <URL:http://ieeexplore.ieee.org/stamp/stamp.jsp?tp=&arnumber=6297159>;pp. 931-937.*

Froglogic GmbH, "Squish: The cross-platform GUI test automation tool," 2011, 2 Pages, [online] [retrieved on Oct. 30, 2011] retrieved from the internet <URL: http://www.froglogic.com/products/index.php>.

Google, "UISpec—Behavior Driven Development for the iPhone," 2011, 2 Pages, [online] [retrieved on Oct. 30, 2011] retrieved from the internet <URL: http://code.google.com/p/uispec/>.

Gorilla Logic, "FoneMonkey," 2011, 2 pages, [online] [retrieved on Oct. 30, 2011] retrieved from the internet <URL: http://www.gorillalogic.com/fonemonkey>.

Micro Focus IP Development Limited, "Borland SilkTest Data Sheet," 2011, 3 Pages, [online] [retrieved on Oct. 30, 2011] retrieved from the internet <URL: http://www.borland.com/resources/en/pdf/products/silk/Borland-SilkTest.pdf>.

Testplant Ltd., "eggPlant: QA automation for productive testing," 2011, 2 Pages, [online] [retrieved on Oct. 30, 2011] retrieved from the internet <URL: http://www.testplant.com/products/eggplant_functional_tester>.

* cited by examiner

CAPTURING AND DISPLAYING STATE OF AUTOMATED USER-LEVEL TESTING OF A GRAPHICAL USER INTERFACE APPLICATION

BACKGROUND

1. Field of Art

This application generally relates to automated user-level testing of a software application that has a graphical user interface (GUI). More particularly, it relates to capturing and displaying the state of automated user-level testing of a GU application.

2. Description of the Related Art

User-level testing of a software application generally involves treating the application as a black box and interacting with the application from the point of view of a user. Automated user-level testing of an application that has a graphical user interface (GUI) generally involves executing a script that simulates user actions (e.g., activating GUI widgets or entering data). The script sends these simulated actions to the application-under-test, observes the application's responses, and determines whether the responses represent appropriate behavior.

Since automated user-level testing requires no human interaction, the testing can be performed when no one is present. The testing generally creates a test log and stores the log so that it can be viewed later on. For example, many automated user-level testing tools create a screenshot of the application-under-test when the application-under-test crashes and store this screenshot. Later on, a software developer can view the screenshot to determine why the crash occurred. Although the screenshot that was taken at the time of crash is helpful, sometimes more information is needed to enable the software developer to determine why the crash occurred.

SUMMARY

In one embodiment, an automated user-level testing tool is enhanced to capture additional information about the state of the automated testing, beyond just a screenshot of the application-under-test. In another embodiment, an automated user-level testing tool is enhanced to capture testing state information for multiple points in time (referred to as "snapshots"), beyond just when the application-under-test crashes. This captured information from one execution of an automated test (one "test run") is stored in one test log, which can then be viewed using a test log viewer.

In one embodiment, the graphical user interface (GUI) for the test log viewer includes four areas: a screenshot area, a test script area, a stack trace area, and a timing area. The content shown in the screenshot area, the test script area, and the stack trace area is specific to a particular point in time during a test (e.g., a particular snapshot). For example, the screenshot area shows a screenshot of the application-under-test at a particular snapshot. The test script area shows the test script code that was executed to perform the test. The highlighted code 160 is the code that caused the snapshot to be captured (the same snapshot as the screenshot). The stack trace area shows the stack trace of the testing process at the same snapshot as the screenshot.

The timing area specifies which snapshot is being used to show corresponding content in the screenshot area, the test script area, and the stack trace area. In one embodiment, the timing area includes a play-pause control, a timeline, and a timestamp. The timeline includes various tick marks and a playhead. The timing area and its components are similar to timing tools within a software application that plays videos.

The timeline represents the duration of one execution of an automated test (one "test run"). Each tick mark represents a point in time at which information (i.e., a snapshot) was collected regarding the testing process. This snapshot information is available for display using the GUI. Since each tick mark corresponds to one snapshot, each tick mark also corresponds to particular content being shown in the screenshot area, the test script area, and the stack trace area. The position of each tick mark along the timeline indicates the time at which that tick mark's snapshot was captured.

A user can specify which snapshot should be used to show corresponding content in the screenshot area, the test script area, and the stack trace area. One way to specify the snapshot is to "grab" (mouse down on) the playhead and drag the playhead to the desired position within the timeline. Another way to specify the snapshot is to enter a time for the timestamp. In one embodiment, as the user drags the playhead within the timeline, the content shown in the screenshot area, the test script area, and the stack trace area changes based on which snapshot applies to the current playhead position. Content from the various snapshots can be displayed automatically in chronological order to make a sort of slideshow or movie (animated using the stop-motion technique) that represents the test run.

DETAILED DESCRIPTION

Figure 1:
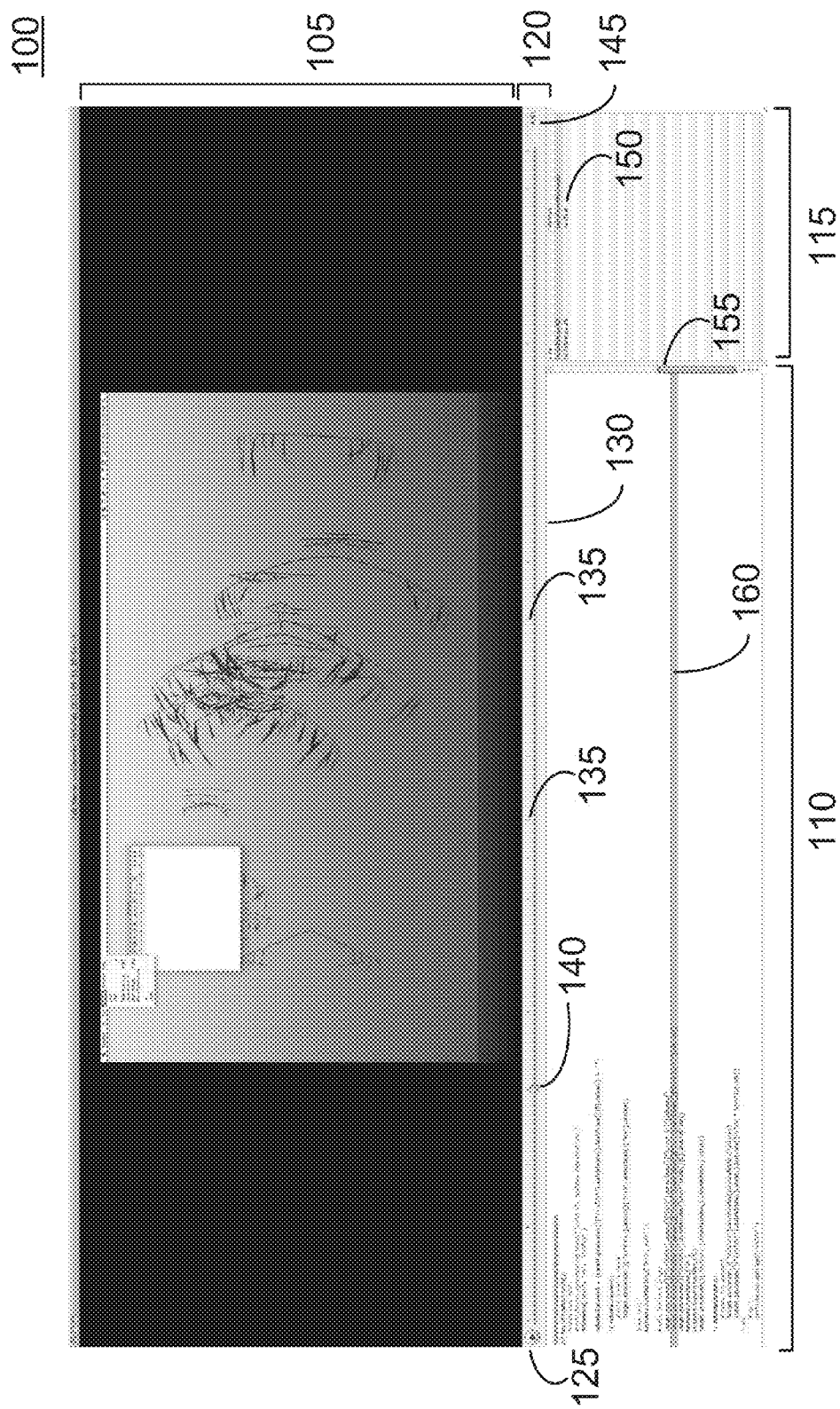
FIG. 1 illustrates a graphical user interface (GUI) for a test log viewer, according to one embodiment of the invention.

The features and advantages described in the specification are not all inclusive and, in particular, many additional features and advantages will be apparent to one of ordinary skill in the art in view of the drawings, specification, and claims. The language used in the specification has been principally selected for readability and instructional purposes, and may not have been selected to delineate or circumscribe the disclosed subject matter.

The figures and the following description relate to embodiments of the invention by way of illustration only. Alternative embodiments of the structures and methods disclosed here may be employed without departing from the principles of what is claimed.

Reference will now be made in detail to several embodiments, examples of which are illustrated in the accompanying figures. Wherever practicable similar or like reference numbers may be used in the figures and may indicate similar or like functionality. The figures depict embodiments of the disclosed systems (or methods) for purposes of illustration only. One skilled in the art will readily recognize from the following description that alternative embodiments of the structures and methods illustrated herein may be employed without departing from the principles described herein.

As explained above, since automated user-level testing requires no human interaction, the testing can be performed when no one is present. The testing generally creates a test log and stores the log so that it can be viewed later on. For example, many automated user-level testing tools create a screenshot of the application-under-test when the application-under-test crashes and store this screenshot. Later on, a software developer can view the screenshot to determine why the crash occurred.

Although the screenshot that was taken at the time of crash is helpful, sometimes more information is needed to enable the software developer to determine why the crash occurred. For example, it might be helpful to have additional information about the state of the automated testing (e.g., the testing environment or the state of the machine on which the test was executed). This additional information might include, for example, the test script code that was executed and the testing process' stack trace (sometimes referred to as a "backtrace" or "call stack"). It might also be helpful to have testing state information for multiple points in time, instead of just when a crash occurs.

In one embodiment, an automated user-level testing tool is enhanced to capture additional information about the state of the automated testing, beyond just a screenshot of the application-under-test. In another embodiment, an automated user-level testing tool is enhanced to capture testing state information for multiple points in time (referred to as "snapshots"), beyond just when a crash occurs. This captured information from one execution of an automated test (one "test run") is stored in one test log, which can then be viewed using a test log viewer.

FIG. 1 illustrates a graphical user interface (GUI) for a test log viewer, according to one embodiment of the invention. In FIG. 1, the GUI 100 includes four areas: a screenshot area 105, a test script area 110, a stack trace area 115, and a timing area 120. The content shown in the screenshot area 105, the test script area 110, and the stack trace area 115 is specific to a particular point in time during a test (e.g., a particular snapshot). For example, the screenshot area 105 shows a screenshot of the application-under-test at a particular snapshot. The test script area 110 shows the test script code that was executed to perform the test. The highlighted code 160 is the code that caused the snapshot to be captured (the same snapshot as the screenshot). (Causing a snapshot to be captured is described below in conjunction with FIG. 3.) The stack trace area 115 shows the stack trace of the testing process at the same snapshot as the screenshot.

The timing area 120 specifies which snapshot is being used to show corresponding content in the screenshot area 105, the test script area 110, and the stack trace area 115. In the illustrated embodiment, the timing area 120 includes a play-pause control 125, a timeline 130, and a timestamp 145. The timeline 130 (sometimes referred to as a "scrubber bar") includes various tick marks 135 and a playhead 140. The timing area 120 and its components in FIG. 1 are similar to timing tools within a software application that plays videos.

The timeline 130 represents the duration of one execution of an automated test (one "test run"). For example, the far left side of the timeline 130 represents the beginning of the test, and the far right side represents the end of the test. Each tick mark 135 represents a point in time at which information (i.e., a snapshot) was collected regarding the testing process. This snapshot information is available for display using the GUI 100. Since each tick mark 135 corresponds to one snapshot, each tick mark also corresponds to particular content being shown in the screenshot area 105, the test script area 110, and the stack trace area 115. The position of each tick mark 135 along the timeline 130 indicates the time at which that tick mark's snapshot was captured. So, the amount of space between a first tick mark and a second tick mark indicates the amount of time that elapsed between capturing a first snapshot and capturing a second snapshot.

The playhead 140 and the timestamp 145 indicate which snapshot is currently being used to show corresponding content in the screenshot area 105, the test script area 110, and the stack trace area 115. Specifically, when the playhead 140 is positioned at a particular tick mark 135, that tick mark indicates which snapshot should be used to show corresponding content in the screenshot area 105, the test script area 110, and the stack trace area 115. The timestamp 145 is the time associated with the position of the playhead 140.

Figure 2A:
FIG. 2A illustrates a GUI for an application-under-test for a first snapshot during the test, according to one embodiment of the invention.

In FIG. 1, the timeline 130 includes 16 tick marks 135. This means that 16 snapshots were captured for this test. The content associated with these 16 snapshots (e.g., screenshot, script code, and stack trace) can be viewed using the GUI 100. Each of FIGS. 2A-2P shows a screenshot from this set of 16 snapshots. In FIGS. 2A-2P, the screenshots are shown in chronological order, from the earliest screenshot (FIG. 2A) to the latest screenshot (FIG. 2P).

In FIG. 1, the playhead 140 is positioned at the fourth tick mark 135, and the timestamp 145 is 4.91. This means that the snapshot content currently being shown occurred 4.91 seconds into the test.

A user can specify which snapshot should be used to show corresponding content in the screenshot area 105, the test script area 110, and the stack trace area 115. One way to specify the snapshot is to "grab" (mouse down on) the playhead 140 and drag the playhead 140 to the desired position within the timeline 130. Another way to specify the snapshot is to enter a time for the time-tamp 145. In one embodiment, as the user drags the playhead 140 within the timeline 130, the content shown in the screenshot area 105, the test script area 110, and the stack trace area 115 changes based on which snapshot applies to the current playhead position.

Content from the various snapshots can be displayed automatically in chronological order to make a sort of slideshow or movie (animated using the stop-motion technique) that represents the test run. Activating the play-pause control 125 causes this stop-motion movie to alternate between playing and pausing. Although FIG. 1 shows only play-pause control 125, other playback controls can be included in GUI 100, such as fast-forward, reverse, fast-reverse, slow-motion, stop, and loop. These other playback controls would affect the playback of the "stop-motion movie" by affecting which snapshot is used to show corresponding content in the screenshot area 105, the test script area 110, and the stack trace area 115.

In one embodiment, screenshots of the entire GUI 100 are captured at each snapshot time, and the GUI 100 screenshots are gathered together into a video file that can be played like a movie. In another embodiment, only the application-undertest screenshots (shown in screenshot area 105) from each snapshot time are gathered together into a video file that can be played like a movie.

Recall that the test script area 110 shows the test script that was executed to perform the test. Appendix A shows an example of a test script, which was written using the Python scripting language. During execution of a script similar to the script in Appendix A, the snapshot shown in FIG. 1 was captured. The test script area 110 in FIG. 1 is too small to show the entire test script, so only a portion is shown. The test script area 110 includes a scroll bar 155 that can be used to scroll the test script so that a different portion is shown in the test script area 110. Appendix A forms part of this disclosure.

Recall that the highlighted code 160 in the test script area 110 is the code that caused the snapshot to be captured (the same snapshot as the screenshot in the screenshot area 105). In FIG. 1, the highlighted code is:

```
target.processes( )["TextEdit"].menus( )["Format"].-
menuItems( )["Font"].menuItems( )["Show Fonts"].choose( )
```

This code simulates the user action of opening the "Format" menu of the "TextEdit" application (and then opening the "Font" menu item within the Format menu and choosing the "Show Fonts" menu item within the Font menu item). The screenshot in the screenshot area 105 therefore shows the TextEdit application with its Format menu showing.

Recall that the stack trace area 115 shows the stack trace of the testing process at the same snapshot as the screenshot shown in the screenshot area 105. In FIG. 1, the stack trace area 115 includes two entries 150. The "Method" portion of each entry includes a method name that indicates which method is being executed. The "Line" portion of each entry includes a file name and a line number that indicate where that method is located. The text in the stack trace area 115 of FIG. 1 is reproduced below in Table 1.

TABLE 1

| Line | Method |
| --- | --- |
| HelloRaft.py:60 | helloFromMacintosh |
| HelloRaft.py:28 | runTest |

The bottom-most entry 150 represents the method that was called first during the testing process. In FIG. 1 (and Table 1), this entry is:
HelloRaft.py:28 runTest
So, the method runTest was called first, and runTest was located in a file named HelloRaft.py at line 28.

In FIG. 1 (and Table 1), the two entries 150 relate to the test script itself. The top-most entry 150 concerns the helloFromMacintosh method. The highlighted code 160 in the test script area 110 is part of the helloFromMacintosh method. The method declaration is visible near the top of the test script area 110 and can also be seen in Appendix A.

The content shown in the test script area 110 and the content shown in the stack trace area 115 are related. Specifically, the content shown in the test script area 110 concerns the method listed in the top-most entry 150 in the stack trace area 115. In one embodiment, if a user clicks on a different stack frame in the stack trace area 115, then the script code shown in the test script area 110 scrolls (if necessary) so that the test script area 110 shows the script code portion that corresponds to the clicked stack frame.

Figure 3:
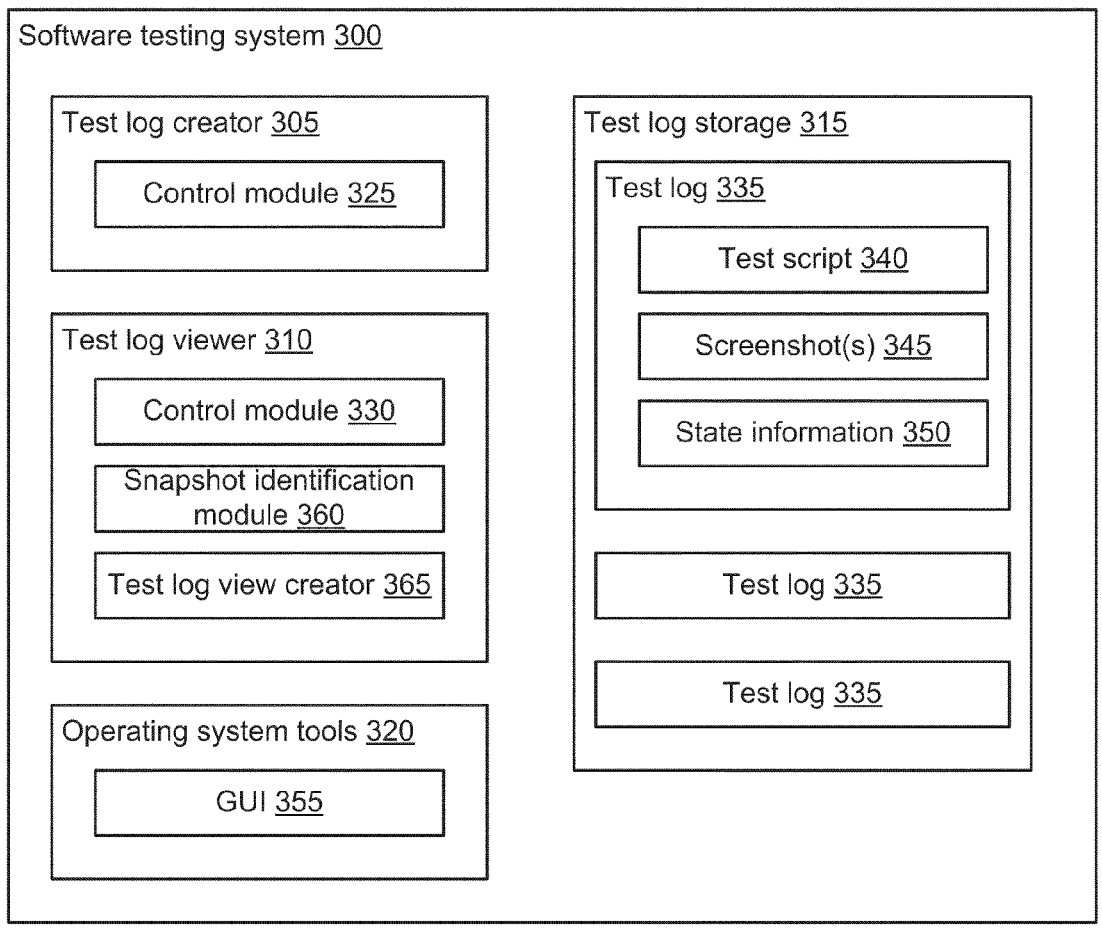
FIG. 3 is a block diagram of a software testing system with a test log viewer, according to one embodiment of the invention.

FIG. 3 is a block diagram of a software testing system with a test log viewer, according to one embodiment of the invention. The software testing system 300 captures and displays the state of automated user-level testing of a GUI application. A user (e.g., a software developer) can view the displayed state. The illustrated software testing system 300 includes a test log creator 305, a test log viewer 310, test log storage 315, and operating system tools 320.

In one embodiment, the test log creator 305 (and its component modules), the test log viewer 310 (and its component modules), and the operating system tools 320 (and its component modules) are one or more computer program modules stored on one or more computer readable storage mediums and executing on one or more processors. The test log storage 315 (and its contents) is stored on one or more computer readable storage mediums. Additionally, the test log creator 305 (and its component modules), the test log viewer 310 (and its component modules), the operating system tools 320 (and its component modules), and the test log storage 315 (and its contents are communicatively coupled to one another to at least the extent that data can be passed between them. In one embodiment, the operating system tools 320 are executing as one or more parts of an operating system on a personal computer, and the test log viewer 310 is executing on the same personal computer.

The test log creator 305 includes a control module 325. The control module 325 creates a test log 335 and stores the test log 335 in test log storage 315. One test log 335 contains information concerning one execution of an automated test (one "test run"). Specifically, a test log 335 includes a test script 340, one or more screenshots 345, and state information 350. The test script 340 is a text file that is a copy of the script that was executed to perform the automated testing. Appendix A shows an example of a test script 340, which was written using the Python scripting language.

The screenshots 345 and the state information 350 concern various times during the testing process. At each of these various times, a "snapshot" of the testing process is captured and saved so that it can be displayed later. This snapshot includes a screenshot 345 of the application-under-test and state information 350. The screenshot 345 is an image file, such as a file that adheres to the Portable Network Graphics image-file format. The state information 350 includes, for example, a reference to the associated screenshot 345, a time of the snapshot, a stack trace of the testing process, an indication of which test script command was being executed, and/or values of variables (global and/or local) within the testing process.

FIGS. 2A-2P show examples of screenshots 345 of an application-under-test at various times during a testing process.

In one embodiment, the state information 350 is a text file in eXtended Markup Language (XML) format that adheres to the Property List (plist) Document Type Definition (DTD). This text file contains information regarding all snapshots captured during a particular test run. Appendix B includes an excerpt of an example of state information 350. The state information excerpt shown in Appendix B concerns the snapshot shown in FIG. 1. Appendix B forms part of this disclosure.

Figure 4:
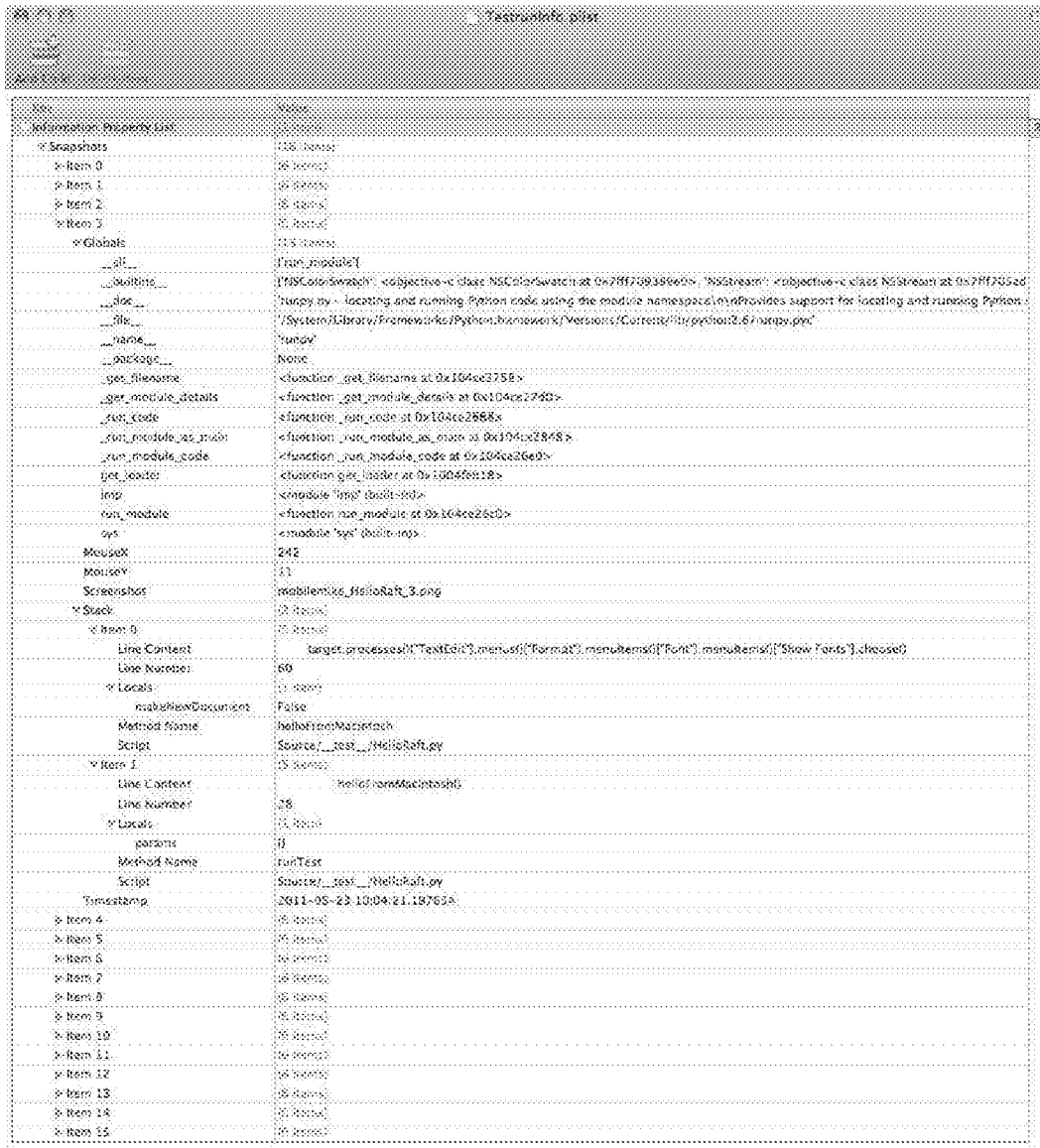
FIG. 4 shows a screenshot from a plist viewer displaying the state information that concerns the snapshot shown in FIG. 1.

When the state information 350 is viewed in plain text format, it can be difficult to understand. In one embodiment, a user (e.g., a software developer) opens a plist file within a software application that is designed to display a plist file so that the file is easier to understand (sometimes referred to as a "plist viewer"). FIG. 4 shows a screenshot from a plist viewer displaying the state information 350 that concerns the snapshot shown in FIG. 1.

A snapshot is captured when a trigger event occurs. In one embodiment, three types of trigger events exist: a failure, an explicit command in a test script, and a high-level user event. A failure trigger event occurs when a test script is being executed and a failure occurs. One type of failure is due to the application-under-test not performing correctly. Another type of failure is due to the test script, which sometimes attempts to perform actions that are not valid for the application-under-test, even when the application-under-test is performing correctly. (Examples are given below.)

An explicit command trigger event occurs when a test script is being executed and a script command (e.g., "take-Snapshot") is encountered that requests that a snapshot be captured.

A high-level user event trigger event occurs when a test script is being executed and the test script simulates a high-level user event. A high-level user event is, for example, a click (e.g., using a pointing device) or a keystroke (e.g., using a keyboard). Since the GUI of the application-under-test is being tested, the application's response to a high-level user event (such as activation of a GUI widget) is usually important. Treating a high-level user event as a trigger event enables useful snapshots to be captured automatically without needing explicit snapshot commands to be present throughout the test script.

In one embodiment, a test script 340 is executed by a test harness (not shown in FIG. 3), and the test harness handles trigger events when they occur. For example, when a trigger event occurs, the test harness uses the test tog creator 305 to create a test log 335 and store the test log 335 in the test log storage 315. In one embodiment, the test harness' sensitivity to each type of trigger event can be turned on or off. If the test harness' sensitivity to a trigger event is turned on, then occurrence of that trigger event will cause a snapshot to be captured (and stored). If the test harness' sensitivity to a trigger event is turned off, then occurrence of that trigger event will not cause a snapshot to be captured.

Since a test log 335 includes one or more screenshot image files (one file for each snapshot), the size of a test log can increase rapidly as more snapshots are captured. In one embodiment, the test harness includes a configuration key (TestrunInfoSizeLimit) that specifies a disk size (e.g., in megabytes). After the sum of the stored test logs' used memory space surpasses this disk size, the test harness automatically deletes one or more of the stored test logs 335. This automatic deletion frees space that can be used to store test logs 335 for future tests.

Recall that each of FIGS. 2A-2P shows a screenshot from a set of 16 screenshots. These 16 screenshots are associated with 16 snapshots captured during one execution of a test script. The test script that caused these 16 snapshots to be captured is similar to the script shown in Appendix A. Since 16 snapshots were captured, 16 trigger events must have occurred. In this example, the application-under-test performed correctly, so no application-type failure trigger events occurred. However, the test script did attempt to perform three actions that were not valid for the application-under-test, so three test script-type failure trigger events occurred. The test script contains one explicit snapshot command (log-Pass, which calls takeSnapshot), so one explicit command trigger event occurred. The remaining 12 trigger events were all high-level user event trigger events. In other words, each of these 12 snapshots (and thus, each screenshot) corresponds to a particular high-level user event.

Figure 2B:
FIG. 2B illustrates a GUI for the same application-under-test as FIG. 2A for a second snapshot during the same test as FIG. 2A, according to one embodiment of the invention.

The 16 trigger events that occurred during the test, along with their script code and relevant screenshots, are as follows:

1) Typing "Hello, Raft!" (see FIG. 2A; window named "Untitled" in upper-left corner).
keyboard.typeString_("Hello, Raft!")
2) Clicking on the "Edit" menu of the "TextEdit" application (see FIG. 2B; causes the menu items to be displayed).

target.processes( )["TextEdit"].menus( )["Edit"].-
menuItems( )["Select All"].choose( )

Figure 2C:
FIGS. 2C-2P illustrate GUIs for the same application-under-test as FIGS. 2A and 2B for a third snapshot through sixteenth snapshot during the same test as FIGS. 2A and 2B, according to one embodiment of the invention.
Figure 2D:
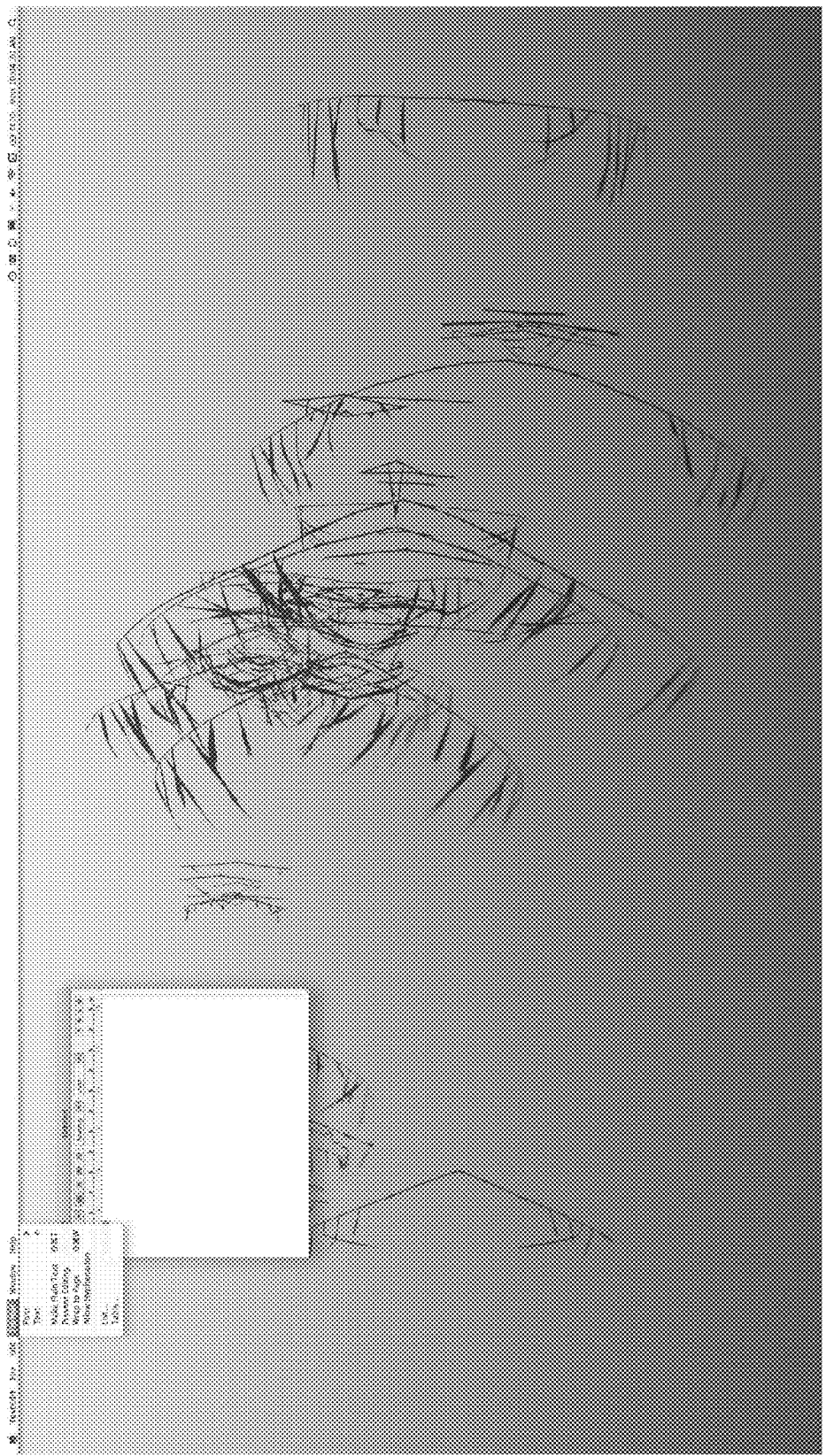

(Note that this one line of script code simulates two high-level user events.)
3) Choosing the "Select All" menu item within the "Edit" menu of the "TextEdit" application (see FIG. 2C; causes "Hello, Raft!" text in Untitled window to be highlighted, shown in FIG. 2D).

target.processes( )["TextEdit"].menus( )["Edit"].-
menuItems( )["Select All"].choose( )

(Note that this one line of script code simulates two high-level user events.)
4) Clicking on the "Format" menu of the "TextEdit" application (see FIG. 2D; causes the menu items to be displayed).

target.processes( )["TextEdit"].menus( )["Format"].-
menuItems( )["Font"].menuItems( )["Show Fonts"].choose( )

Figure 2E:
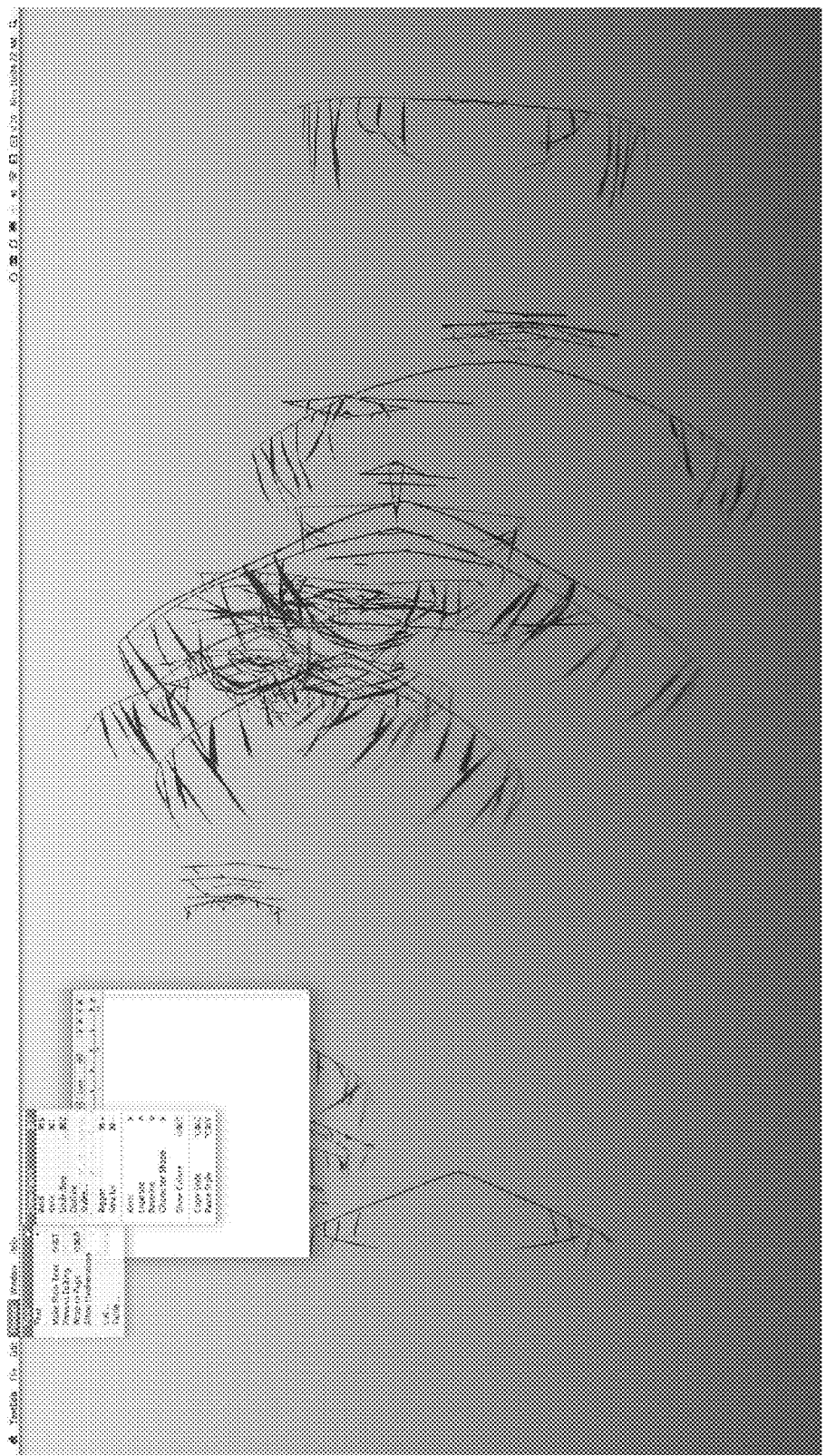
Figure 2F:

(Note that this one line of script code simulates two high-level user events.)
5) Choosing the "Show Fonts" menu item within the "Font" menu item within the "Format" menu of the "TextEdit" application (see FIG. 2E; causes a window named "Fonts" to appear in the lower-right corner, shown in FIG. 2F).

target.processes( )["TextEdit"].menus( )["Format"].-
menuItems( )["Font"].menuItems( )["Show Fonts"].choose( )

(Note that this one line of script code simulates two high-level user events.)
6) Double clicking within the first text field within the front window of the "Text Edit" application (see FIG. 2F; Size field contents are selected in Fonts window).

target.processes( )["TextEdit"].frontWindow( ).textFields( )[0].-
doubleClick( )

Figure 2G:
Figure 2H:
Figure 21:
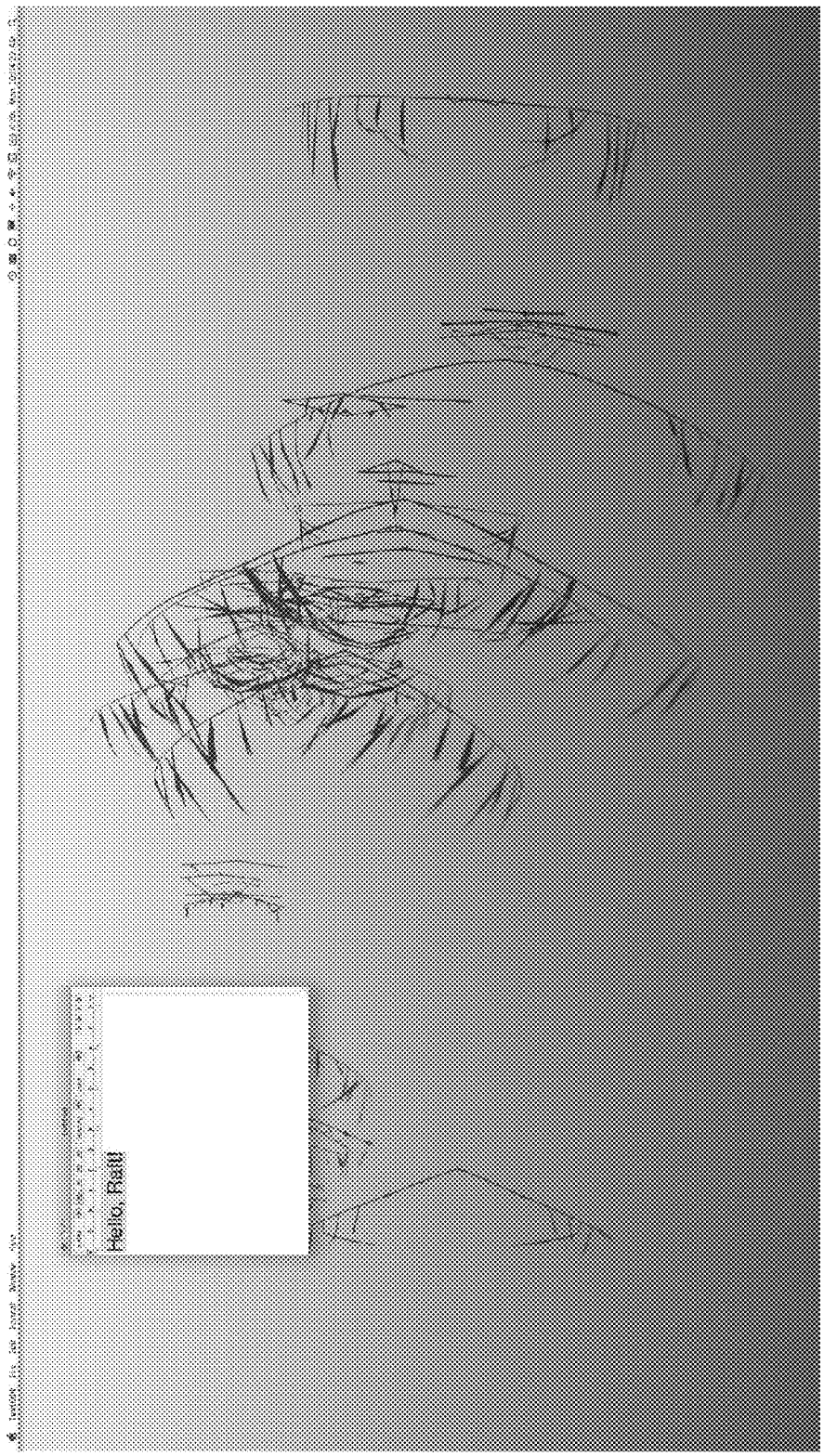
Figure 2J:

7) Typing "36" (see FIG. 2G; "36" entered into Size field in Fonts window).
keyboard.typeString_("36")
8) Pressing the Enter key (see FIG. 2H; "Hello, Raft!" text in Untitled window has been resized to 36).
keyboard.typeVirtualKey_(76)
9) Clicking the close button in the front window of the "Text Edit" application (see FIG. 2I; Fonts window has disappeared).
target.processes( )["TextEdit"].frontWindow( ).closeButton( ).click( )
10) Clicking on the main menu of the "TextEdit" application (see FIG. 2J).
raftlibs.sui.quitApp("TextEdit")

(quitApp is a library function that attempts to quit a given application using a series of different methods. The first method is to bring the application to the front and choose the "quit" option from the main menu. If any confirmation dialogs appear, then quitApp tries to dismiss them. (This will be discussed below.) quitApp is defined in the file quitapp.py. An excerpt of quitapp.py is shown in Appendix C. Appendix C forms part of this disclosure. For this particular snapshot, the relevant code from quitapp.py is:

```
quitAppViaMenu(process, dockItemName)
which calls
process.menus( )[1].menuItems( ).firstWithPredicate_("name beginswith 'Quit'").choose( )
``` quitAppViaMenu is a library function defined in the file quitapp.py. An excerpt of quitapp.py is shown in Appendix C. Note that this one line of script code simulates two high-level user events.)

Figure 2K:

11) Choosing the "Quit TextEdit" menu item within the main menu of the "TextEdit" application (see FIG. 2K; causes a confirmation dialog (specifically, a "Do you want to save . . . " sheet) to be displayed on top of the Untitled window, shown in FIG. 2L).
raftlibs.sui.quitApp("TextEdit")
(For this particular snapshot, the relevant code from quitapp.py is:

```
quitAppViaMenu(process, dockItemName)
which calls
process.menus( )[1].menuItems( ).firstWithPredicate_("name beginswith 'Quit'").choose( )
```

Note that this one line of script code simulates two high-level user events)

Figure 2L:
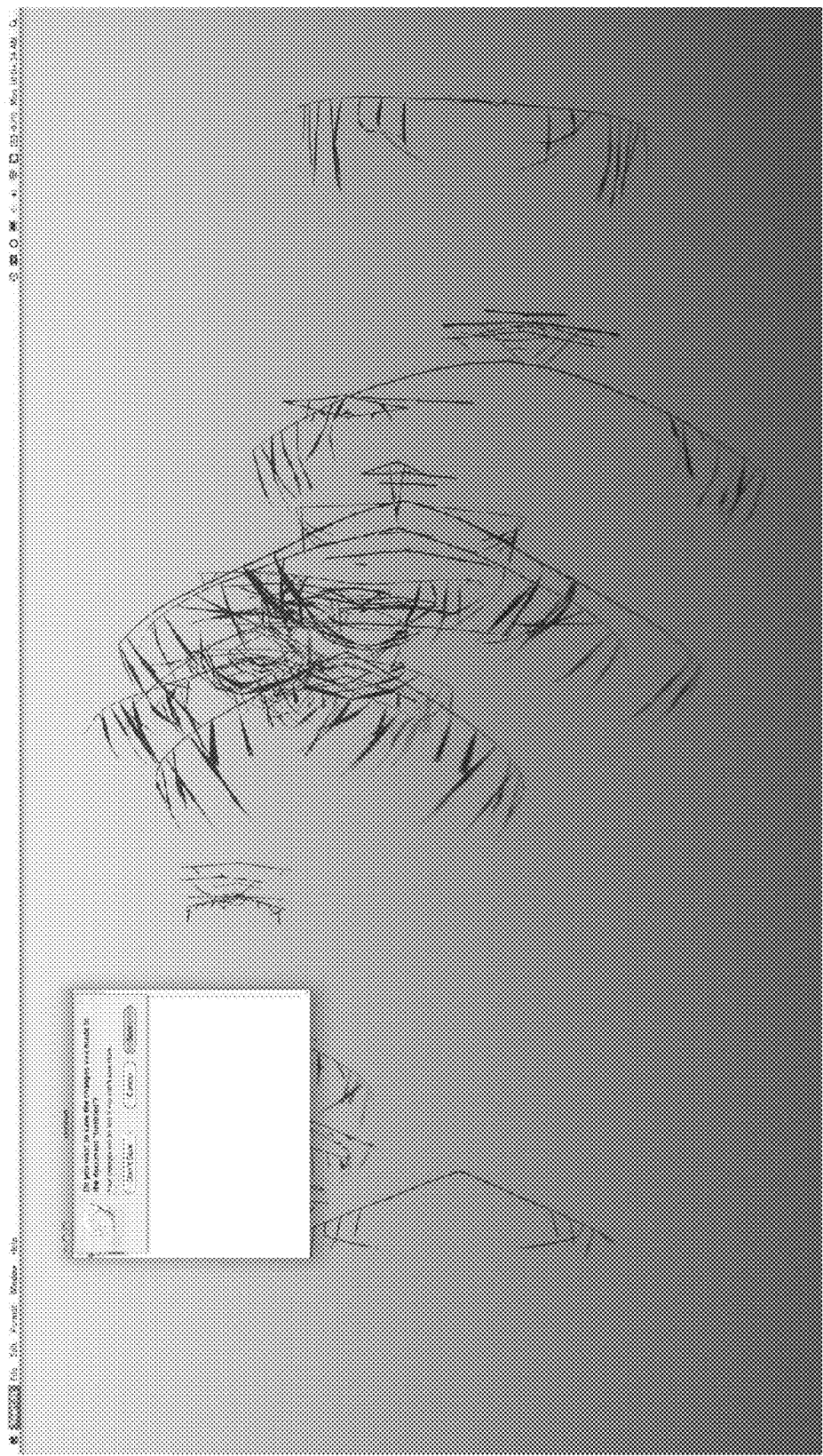

12) Trying to access an alert window when no alert window exists (see FIG. 2L; the confirmation dialog ("Do you want to save . . . " sheet) continues to be displayed on top of the Untitled window).
raftlibs.sui.quitApp("TextEdit")
(For this particular snapshot, the relevant code from quitapp.py is:

```
quitAppViaMenu(process, dockItemName)
which calls
yesIAmSure(processName)
which calls
buttonDomains = (window, window.sheet( ),
target.frontProcess( ).windows( )["alert"])
```

Recall that quitApp tries to dismiss any confirmation dialogs that appear. This is performed using the yesIAmSure library function. yesIAmSure attempts to click common confirmation buttons in common windows ("clickTheButtonIn"). The windows include the main window, a sheet overlaid on the main window, and an alert window ("buttonDomains"). The buttons include buttons whose names contain the strings "Quit", "Don't Save", "Close", "Discard", "Overwrite", and "Terminate" ("buttonMatchStrings"). yesIAmSure is defined in the file quitapp.py. An excerpt of quitapp.py is shown in Appendix C. For this particular snapshot, the domain is the alert window. Since no alert window exists, trying to access the alert window causes a test script-type failure. In response to this failure, the test harness captures a snapshot.)

Figure 2M:
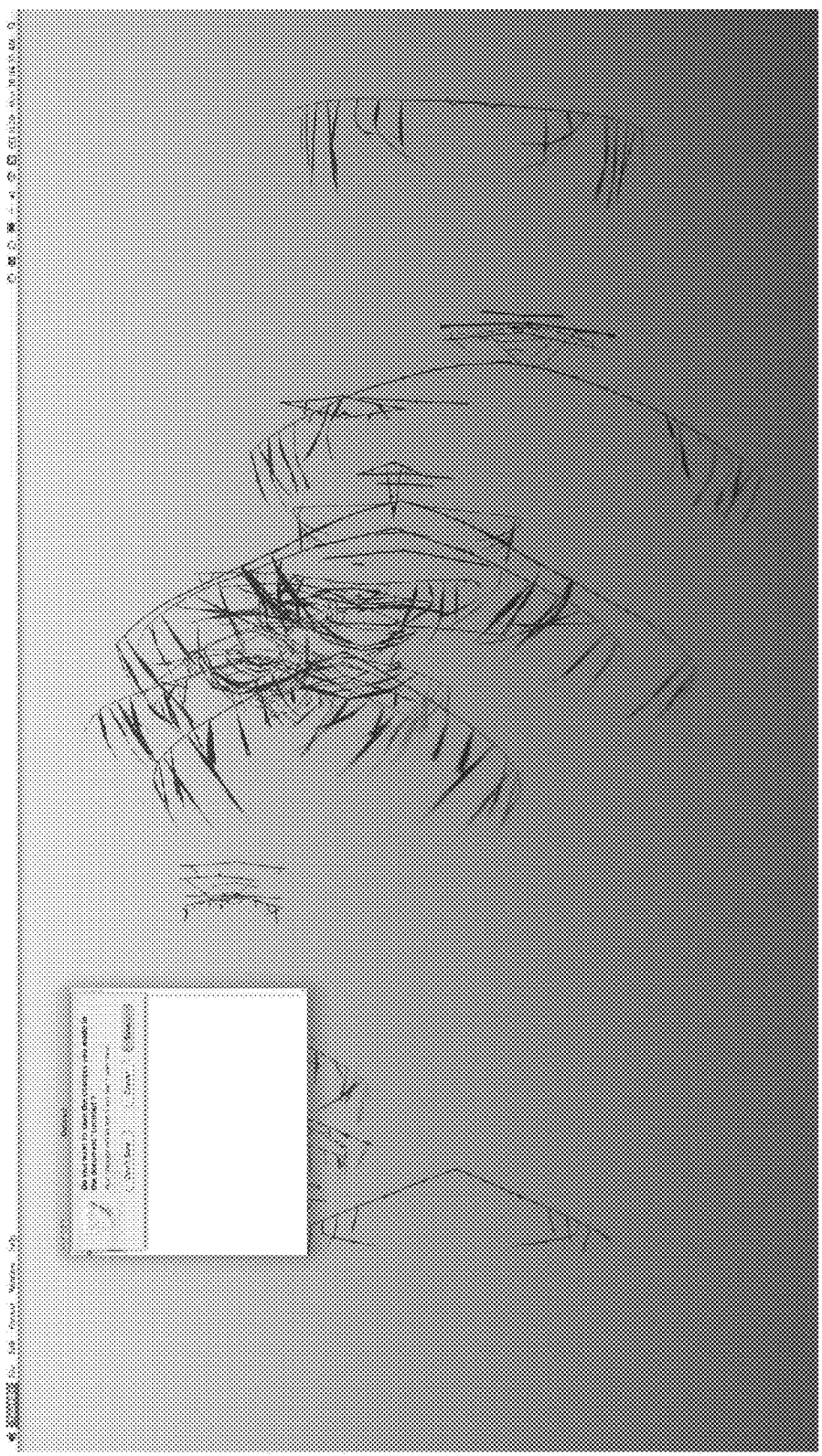

13) Trying to click on a button in the main window when no buttons exist (see FIG. 2M; the confirmation dialog ("Do you want to save . . . " sheet) continues to be displayed on top of the Untitled window).
raftlibs.sui.quitApp("TextEdit")
(For this particular snapshot, the relevant code from quitapp.py is:

```
quitAppViaMenu(process, dockItemName)
which calls
yesIAmSure(processName)
which calls
for domain in buttonDomains:
    if clickTheButtonIn(domain) : return True
return False
```

For this particular snapshot, the domain is the main window. Since the main window does not contain any buttons, trying to click on a button in the main window causes a test script-type failure. In response to this failure, the test harness captures a snapshot.)

Figure 2N:
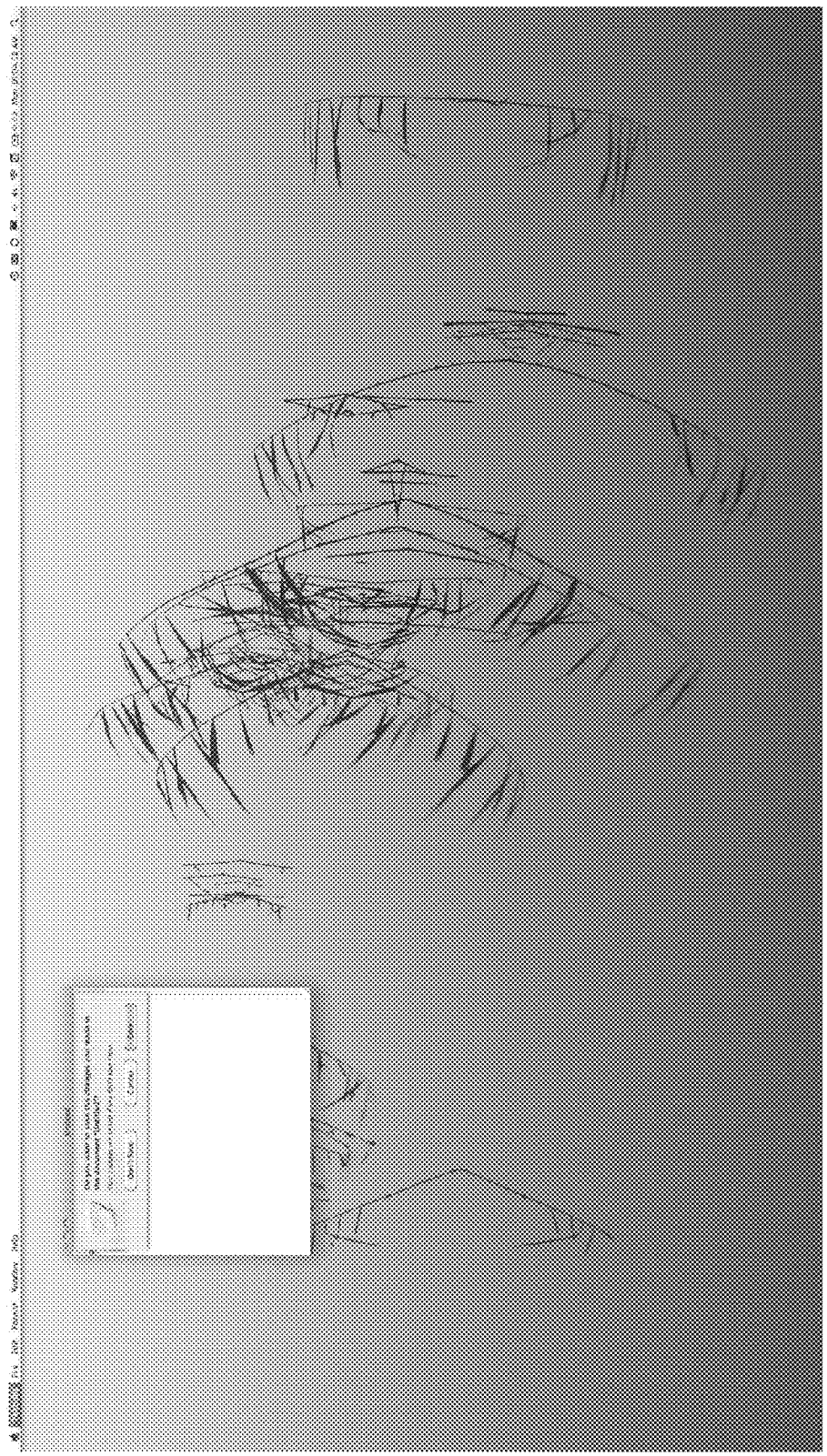
Figure 20:
Figure 2P:
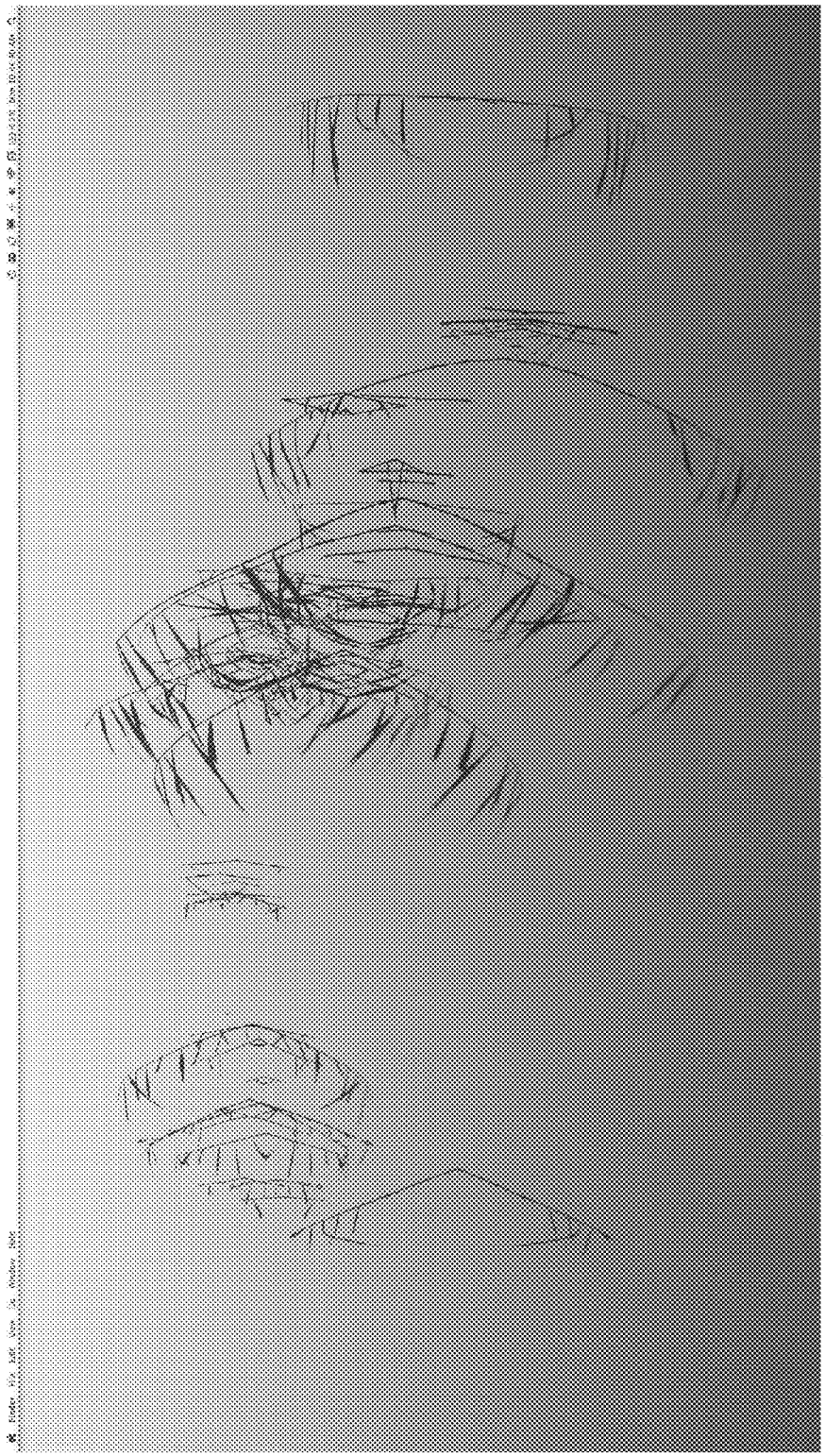

14) Trying to click on a "quit" button in the sheet overlaying the main window when no "quit" button exists (see FIG. 2N; the confirmation dialog ("Do you want to save . . . " sheet) continues to be displayed on top of the Untitled. window).
raftlibs.sui.quitApp("TextEdit")
(For this particular snapshot, the relevant code from quitapp.py is:

```
quitAppViaMenu(process, dockItemName)
which calls
yesIAmSure(processName)
which calls
for matchStr in buttonMatchStrings:
    button = elem.buttons( ).firstWithPredicate_("name like '%s' % matchStr)
    button.click( )
```

For this particular snapshot, the domain is the sheet overlaying the main window, and the button name string to match is "Quit." Since the sheet does not contain a button whose name matches "Quit", trying to click on such a button causes a test script-type failure. In response to this failure, the test harness captures a snapshot.)

15) Clicking on a "don't save" button in the sheet overlaying the main window (see FIG. 2O; causes the confirmation dialog ("Do you want to save . . . " sheet) to disappear, causes the Untitled window to disappear, and exits the TextEdit application).
raftlibs.sui.quitApp("TextEdit")
(For this particular snapshot, the relevant code from quitapp.py is:

```
quitAppViaMenu(process, dockItemName)
which calls
yesIAmSure(processName)
which calls
for matchStr in buttonMatchStrings:
    button = elem.buttons( ).firstWithPredicate_("name like '%s' % matchStr)
    button.click( )
```

For this particular snapshot, the domain is the sheet overlaying the main window, and the button name string to match is "Don't Save." Since the sheet does contain a button whose name matches "Don't Save", clicking on this button succeeds.)

16) Explicit snapshot command (see FIG. 2P; TextEdit passed the test).
logPass( )

The test log viewer 310 includes a control module 330, a snapshot identification module 360, and a test tog view creator 365. The control module 330 shows test log information for various points in time (i.e., snapshots) during a test. Its operation is discussed below with reference to FIG. 5.

The snapshot identification module 360 identifies a relevant snapshot given a timestamp and a test log 335. The timestamp is a time during the execution of an automated test, where the test execution is associated with the test log 335. The snapshot identification module 360 maps the timestamp to a snapshot that was active at that timestamp. The mapping is performed based on the timestamp and the snapshots defined within the test log 335. Which snapshot is appropriate depends on the timestamps associated with the snapshots and the given timestamp. (Recall that the state information 350 includes a timestamp for each snapshot.) For example, the snapshot identification module 360 identifies which snapshot (within the test log 335) occurred most recently compared to the given timestamp. The snapshot identification module 360 then returns that snapshot.

The test log view creator 365 creates a view of a test log (similar to GUI 100 in FIG. 1) given a snapshot. The created test log view includes a relevant screenshot shown in screenshot area 105, relevant script code shown in script code area 110, and a relevant stack trace shown in stack trace area 115. The relevant screenshot, the relevant script code, and the relevant stack trace are identified based on the given snapshot. (Recall that the state information 350 includes, for each snapshot, a reference to a screenshot, a reference to a line of script code, and a stack trace. Also, the test log 335 includes the test script 340.)

The test log storage 315 stores test logs 335. Although FIG. 3 shows the test log storage 315 storing three test logs 335, any number of test logs 335 can be stored. In one embodiment, each test log 335 is stored in a different subdirectory so that the contents of the same test log can be easily identified.

The operating system tools 320 include a graphical user interface (GUI) 355. The GUI 355 outputs information to a use (e.g., using a display device) and receives information from a user (e.g., using a pointing device and/or keyboard).

Figure 5:
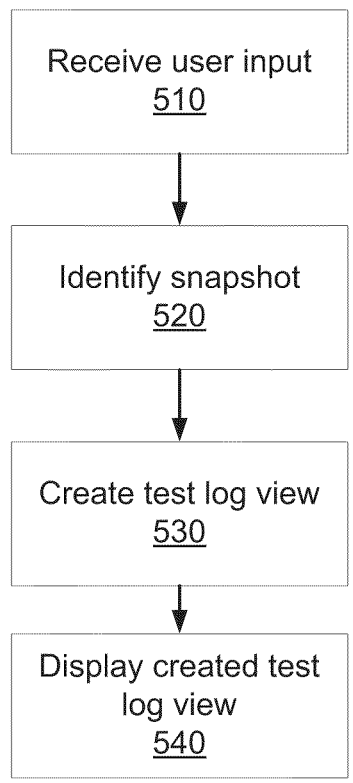
FIG. 5 is a flowchart of a method for displaying test log information for various snapshots during a test, according to one embodiment of the invention.

FIG. 5 is a flowchart of a method for displaying test log information for various snapshots during a test, according to one embodiment of the invention, in one embodiment, steps 510 to 540 are performed by various modules within the software testing system 300. When the method of FIG. 5 begins, an automated test has already been executed, and the corresponding test log 335 has already been created and stored in the test log storage 315. Also, contents of the first snapshot of that test log 335 are currently being displayed by the GUI 355 (e.g., similar to GUI 100 in FIG. 1).

In step 510, user input is received. For example, a user moves the playhead 140 of the timeline 130 within the timing area 120. The GUI 355 processes the user input and provides the new position of the playhead 140 to the control module 330. The control module 330 receives 510 the user input (e.g., the new playhead position).

In step 520, an appropriate snapshot is identified. For example, the control module 330 determines a timestamp that corresponds to the received playhead position. The control module 330 then uses the snapshot identification module 360 to identify the snapshot that occurred most recently compared to the determined timestamp.

In step 530, a test log view is created. For example, the control module 330 uses the test log view creator 365 to create a view of the test log (similar to GUI 100 in FIG. 1) based on the identified snapshot.

In step 540, the created test log view is displayed. For example, the control module 330 provides the created test log view to the GUI 355. The GUI displays 540 the created test tog view.

If additional user input is received, the method in FIG. 5 is repeated (not shown).

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the above description. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

APPENDIX A (TEST SCRIPT EXAMPLE)

```
#!/usr/bin/python
# -*- coding: utf-8 -*-
if __name__ == '__main__':
    # The following code allows this test to be invoked outside the
    # harness and should be left unchanged
    import os, sys
    args =
[os.path.realpath(os.path.expanduser("~xupdate/raftsandbox/raft")), "-f"] + sys.argv
    os.execv(args[0], args)
"""
HelloRaft
"""
# This is a RAFT test.
testDescription = "Hello World, Raft Style"
testVersion = "1.0"
testState = ProductionState # Possible values: DevelopmentState,
    # ProductionState
testCustomDBSpec = { } # for the exceptional case when custom data
    # fields are needed
def runTest(params):
    ''' Says Hello in TextEdit as a simple Raft demo '''
    helloFromMacintosh( )
##########################################
def helloFromMacintosh( ):
    # open text edit
    #raftlibs.sui.openAppUsingFinder("TextEdit",
appPath='/Applications')
    doCommand("open", "-a", "TextEdit")
    # Determine whether TextEdit already has an open window. If it
    # does, then a new document should be created and used for testing.
    # Set the value of the variable makeNewDocument to be "true".
    # The value of makeNewDocument also affects how TextEdit will be
    # exited at the end of the test. In the testing example shown in
    # FIGS. 2A-2P, the value of makeNewDocument is false.
    makeNewDocument =
(target.processes( )["TextEdit"].mainWindow( ).textViews( )[0].-
```

APPENDIX A-continued (TEST SCRIPT EXAMPLE)

```
value( ) != "")
    # If a document already exits, then create a new document for the
    # test.
    if makeNewDocument:
        # make a new document.
        target.processes( )["TextEdit"].menus( )["File"].-
menuItems( )["New"].choose( )
    # say hello
    keyboard.typeString_("Hello, Raft!")
    # make the text bigger
    target.processes( )["TextEdit"].menus( )["Edit"].menuItems( )["Select All"].choose( )
    target.processes( )["TextEdit"].menus( )["Format"].-
menuItems( )["Font"].menuItems( )["Show Fonts"].choose( )
    target.processes( )["TextEdit"].frontWindow( ).textFields( )[0].-
doubleClick( )
    keyboard.typeString_("36")
    keyboard.typeVirtualKey_(76)
    # Close the Font Format window
    target.processes( )["TextEdit"].frontWindow( ).closeButton( ).click( )
    # If a new document was created for this test, then just close the
    # test document and leave TextEdit running. So, click the close
    # button on the test document and don't save it. If a new document
    # was not created for this test, then just quit TextEdit entirely.
    # So, execute the quitApp library function. Since makehewDocument
    # is false for the testing example shown in FIGS. 2A-2P, the quitApp
    # library function will be executed to quit TextEdit.
    if makeNewDocument:
        # Close the document, but leave TextEdit running since a
        # document already existed when the test was started,
        target.processes( )["TextEdit"].mainWindow( ).closeButton( ).click( )
        target.processes( )["TextEdit"].mainWindow( ).sheet( ).-
buttons( )[Don't Save"].click( )
    else:
        # Quit by executing the quitApp library function. quitApp
        # selects the "Quit" menu item and handles the "Do you want to
        # save..." sheet.
        raftlibs.sui.quitApp("TextEdit")
    # Test is over. Log that test was passed.
    logPass( )
```

APPENDIX B (STATE INFORMATION EXAMPLE)

```
<dict>
    <key>Globals</key>
    <dict>
        <key>__all__</key>
        <string>['run_module']</string>
        <key>__builtins__</key>
        <string>{'NSColorSwatch': <objective-c class NSColorSwatch at 0x7fff709389e0>, 'NSStream': <objective-c class NSStream at 0x7fff705ad8d8>, 'NSRunningApplication': <objective-c class NSRunningApplication at 0x7fff70946950>,
'NSKeyValueSlowMutableArray': <objective-c class NSKeyValueSlowMutableArray at 0x7fff70c010e8>,
'NSKeyValueUndefinedGetter': <objective-c class NSKeyValueUndefinedGetter at 0x7fff70c00b48>, 'Foundation':
<module 'Foundation' from
'/System/Library/Frameworks/Python.framework/Versions/Current/Extras/lib/python/PyObjC/Foundation/__init__.pyc'>,
'NSCMYKSliders': <objective-c class NSCMYKSliders at 0x7fff70938e90>, 'NSToolbarPoofAnimator':
<objective-c class NSToolbarPoofAnimator at 0x7fff70942350>,
'kUIAVerboseAXAPIDisabled': 512, 'CIBlendWithMask': <objective-c class CIBlendWithMask at 0x7fff7110de60>, 'NSRTFD':
<objective-c class NSRTFD at 0x7fff7093e430>, 'NSODSession':
<objective-c class NSODSession at 0x7fff710e4640>,
'NSCondition': <objective-c class
NSCondition at 0x7fff70c01b88>, 'NSPICTImageRe</string>
        <key>__doc__</key>
        <string>'runpy.py - locating and running Python code using the module namespace\n\nProvides support for locating and running Python scripts using the Python\nmodule namespace instead of the native
```

APPENDIX B-continued

(STATE INFORMATION EXAMPLE)

filesystem.\n\nThis allows Python code to play nicely with non-filesystem based PEP 302\nimporters when locating support scripts as well as when importing modules.\n'</string>
    <key>__file__</key>
<string>'/System/Library/Frameworks/Python.framework/Versions/Current/lib/python2.6/runpy.pyc'</string>
    <key>__name__</key>
    <string>'runpy'</string>
    <key>__package__</key>
    <string>None</string>
    <key>_get_filename</key>
    <string><function _get_filename at 0x104ce2758></string>
    <key>_get_module_details</key>
    <string><function _get_module_details at 0x104ce27d0></string>
    <key>_run_code</key>
    <string><function _run_code at 0x104ce2668></string>
    <key>_run_module_as_main</key>
    <string><function _run_module_as_main at 0x104ce2848></string>
    <key>_run_module_code</key>
    <string><function _run_module_code at 0x104ce26e0></string>
    <key>get_loader</key>
    <string><function get_loader at 0x1004feb18></string>
    <key>imp</key>
    <string><module 'imp' (built-in)></string>
    <key>run_module</key>
    <string><function run_module at 0x104ce28c0></string>
    <key>sys</key>
    <string><module 'sys' (built-in)></string>
</dict>
<key>MouseX</key>
<real>242</real>
<key>MouseY</key>
<real>11</real>
<key>Screenshot</key>
<string>mobilemike__HelloRaft__3.png</string>
<key>Stack</key>
<array>
  <dict>
    <key>Line Content</key>
    <string>target.processes( )["TextEdit"].menus( )["Format"].menuItems( )["Font"].menuItems( ) ["Show Fonts"].choose( )</string>
    <key>Line Number</key>
    <integer>60</integer>
    <key>Locals</key>
    <dict>
      <key>makeNewDocument</key>
      <string>False</string>
    </dict>
    <key>Method Name</key>
    <string>helloFromMacintosh</string>
    <key>Script</key>
    <string>Source/__test__/HelloRaft.py</string>
  </dict>
  <dict>
    <key>Line Content</key>
    <string>    helloFromMacintosh( )</string>
</string>
    <key>Line Number</key>
    <integer>28</integer>
    <key>Locals</key>
    <dict>
      <key>params</key>
      <string>{ }</string>
    </dict>
    <key>Method Name</key>
    <string>runTest</string>
    <key>Script</key>
    <string>Source/__test__/HelloRaft.py</string>
  </dict>
</array>

APPENDIX B-continued

(STATE INFORMATION EXAMPLE)

<key>Timestamp</key>
<string>2011-05-23 10:04:21.197654</string>
</dict>

APPENDIX C

(TEST SCRIPT LIBRARY EXAMPLE - QUITAPP)

```
'''
quitapp.py
Utilities for quitting applications conveniently.
'''
__all__ = ['yesIAmSure', 'quitAppViaMenu', 'terminateProcess',
'killProcess', 'quitApp']
def yesIAmSure(app=None):
    """Attempts to click common sets of confirmation buttons in a
variety of applications.
    Returns True if any buttons were clicked, False otherwise.
    If app is specified, stop looking for buttons when the app exits.
    The argument 'app' can be a process name, process identifier, or
UIAProcess object.
    """
    if app is None:
        process = raftlibs.sui.withPatience(0)(target.frontProcess)( )
    else:
        process =
raftlibs.sui.withPatience(0)(__processFromMultiType)(app)
    if not process:
        return False
    target.pushPatience__(2)
    try:
        window = process.mainWindow( )
        buttonMatchStrings = ('*Quit*', 'Don*t Save*', '*Close*',
'Discard*', '*Overwrite*', 'Terminate*')
        buttonDomains = (window, window.sheet( ),
target.frontProcess( ).windows( )["alert"])
    finally:
        target.popPatience( )
    @raftlibs.sui.withPatience(0)
    def clickTheButtonIn(elem):
        if process.waitForInvalid( ):
            return False
        if not elem:
            return False
        if not elem.buttons( ):
            return False
        for matchStr in buttonMatchStrings:
            button = elem.buttons( ).firstWithPredicate__("name like '%s'" % matchStr)
            if button:
                print "quitapp: Clicking button '%s'" %
button.name( )
                button.click( )
                return True
        return False
    for domain in buttonDomains:
        if clickTheButtonIn(domain):
            return True
    return False
def __processFromMultiType(process):
    if isinstance(process, UIAProcess):
        return process
    elif isinstance(process, (int, long)):
        return target.processes( ).firstWithPredicate__("pid == %i" %
process)
    elif isinstance(process, (str, unicode)):
        return target.processes( )[process]
    raise Exception("Unknown process name or identifier %s"
% process)
def quitAppViaMenu(app, dockItemName=None):
    """Attempt to bring the given application to the front and quit
using its main menu UI.
    The argument 'app' can be a process name, process identifier, or
UIAProcess object.
    Wait up to patience timeout for the process to exit.
    dockItemName is an optional parameter to allow callers to specify a
```

APPENDIX C-continued (TEST SCRIPT LIBRARY EXAMPLE - QUITAPP)

```
different dock item name for the application, if needed.
    Returns True if the application was exited successfully, False
otherwise.
    Raises OSError if the process does not exist.
    """
    import os
    import objc
    process = _processFromMultiType(app)
    if not process:
        raise OSError(3, os.strerror(3))
    processName = process.name( )
    if not dockItemName:
        dockItemName = processName
    at Front = False
    if target.frontProcess( ).name( ) == processName:
        atFront = True
    else:
        for i in range(3):
            target.dock( ).dockItems( )[dockItemName].click( )
            if target.frontProcess( ).withName_(processName):
                atFront = True
                break
    if atFront:
        try:
            process.menus( )[1].menuItems( ).-
firstWithPredicate_("name beginswith 'Quit'").choose( )
            yesIAmSure(processName)
            if process.waitForInvalid( ):
                # Quit successfully
                return True
        except Exception, e:
            if isinstance(e, objc.error) and getattr(e, "name",
None) == u'kUIAExceptionUserCanceled':
                # User pressed global interrupt. Reroute this
here, since this method is so widely used.
                raise
            print "quitapp: Caught exception: ", e
    return False
def terminateProcess(process):
    """Send SIGTERM to the given process, which can be a process
name, process identifier, or UIAProcess object.
    Wait up to patience timeout for the process to exit.
    Returns True if the application was exited successfully, False
otherwise.
    Raises OSError if the process does not exist.
    """
    import os
    import signal
    process = _processFromMultiType(process)
    processName = process.name( )
    if not process:
        raise OSError(3, os.strerror(3))
    print "quitapp: Sending sigterm to %s..." % processName
    os.kill(process.pid( ), signal.SIGTERM)
    if process.waitForInvalid( ):
        print "quitapp: %s quit successfully" % processName
        return True
    return False
def killProcess(process):
    """Send SIGKILL to the given process, which can be a process
name, process identifier, or UIAProcess object.
    Wait up to patience timeout for the process to exit.
    Returns True if the application was exited successfully, False
otherwise.
    Raises OSError if the process does not exist.
    """
    import os
    import signal
    process = _processFromMultiType(process)
    processName = process.name( )
    if not process:
        raise OSError(3, os.strerror(3))
    print "quitapp: Sending sigkill to %s..." % processName
    os.kill(process.pid( ), signal.SIGKILL)
    if process.waitForInvalid( ):
        print "quitapp: %s quit successfully" % processName
        return True
    return False
```

APPENDIX C-continued (TEST SCRIPT LIBRARY EXAMPLE - QUITAPP)

```
def quitApp(app, dockItemName=None):
    """Attempts to quit the given application named app, which can be a
process name, process identifier, or UIAProcess object.
    quitApp uses a series of methods to quit the application, in order.
With each attempt, quitApp waits up to the patience timeout for the app to
exit.
    1) Bring the application to the front and choose the quit option
from the main menu
        a) If any confirmation dialogs appear, try to dismiss them
    2) Send SIGTERM to the process
    3) Send SIGKILL to the process
    dockItemName is an optional parameter to allow callers to specify a
different dock item name for the application, if needed.
    Returns True if successful in terminating the application or if the
application was not running, False otherwise.
    """
    process = _processFromMultiType(app)
    If not process:
        print "quitapp: '%s' was not running" % app
        return True
    processName = process.name( )
    if not dockItemName:
        dockItemName = processName
    try:
        if quitAppViaMenu(process, dockItemName) or
terminateProcess(process) or killProcess(process):
            return True
    except OSError, ose:
        # catch the race between each quit method
        return True
    print "quitapp: Failed to quit app '%s'" % processName
    return False
```

What is claimed is:

1. A computer-implemented method comprising:
based on a user input, determining, by a computing device, a snapshot of an automated test executed for a graphical user interface application, wherein the snapshot of the automated test is captured in response to a triggering event comprising a failure of the graphical user interface application;
determining, by the computing device, testing state information associated with the snapshot, wherein the testing state information corresponds to a point in time within an execution time of the automated test, wherein the testing state information comprises a reference to an associated screenshot, an indication of the point in time, a stack trace associated with the automated test, and an indication of a command in a test script executed at the point in time that caused the failure of the graphical user interface application, wherein the test script simulates user input to the graphical user interface application; and
presenting, on a graphical user interface of the computing device, a view of a test log associated with the automated test, wherein the view comprises a screenshot area displaying the associated screenshot, a stack trace area displaying the stack trace associated with the automated test at a time when the snapshot was captured, a timing area indicating the point in time, and a test script area displaying the test script and highlighting the test script command executed at the point in time that caused the failure of the graphical user interface application, wherein the test script command simulates a particular user input to the graphical user interface application.

2. The method of claim 1, wherein execution of the test script command caused a high-level user event to be simulated.

3. The method of claim 2, wherein the high-level user event comprises at least one of a click and a keystroke.

4. The method of claim 1, wherein execution of the test script command caused the graphical user interface application to perform incorrectly.

5. The method of claim 1, wherein the user input comprises activating a play-pause graphical user interface control.

6. The method of claim 1, wherein the user input comprises dragging a play head graphical user interface control within a timeline.

7. The method of claim 1, wherein the user input comprises entering a timestamp value.

8. The method of claim 1, wherein the snapshot is further associated with a timestamp value indicating when the snapshot was captured.

9. The method of claim 1, wherein the snapshot is further associated with a value of a variable within the automated testing.

10. The method of claim 1, wherein the view includes the indication of the point in time within the execution time of the automated test and a timeline representing a duration of the automated test.

11. The method of claim 10, wherein the view further includes a second test script command, and wherein the test script command code is visually distinguishable from the second test script command.

12. A non-transitory computer-readable medium storing instructions which, when executed by a processor, cause the processor to perform operations comprising:
    based on a user input, determining a snapshot of an automated test executed for a graphical user interface application, wherein the snapshot of the automated test is captured in response to a triggering event comprising a failure of the graphical user interface application;
    determining testing state information associated with the snapshot, wherein the testing state information corresponds to a point in time within an execution time of the automated test, wherein the testing state information comprises a reference to an associated screenshot, an indication of the point in time, a stack trace associated with the automated test, and an indication of a command in a test script executed at the point in time that caused the failure of the graphical user interface application, wherein the test script simulates user input to the graphical user interface application; and
    presenting, on a graphical user interface, a view of a test log associated with the automated test, wherein the view comprises a screenshot area displaying the associated screenshot, a stack trace area displaying the stack trace associated with the automated test, a timing area indicating the point in time, and a test script area displaying the test script and highlighting the test script command executed at the point in time that caused the failure of the graphical user interface application, the stack trace area being specific to the point in time within the execution time of the automated test, and wherein the snapshot is associated with the point in time, wherein the test script command simulates a particular user input to the graphical user interface.

13. The non-transitory computer-readable medium of claim 12, wherein the view further comprises a timeline representing a plurality of points in time within an execution of the automated test, wherein each of the plurality of points is associated with a corresponding snapshot.

14. The non-transitory computer-readable medium of claim 13, wherein each of the plurality of points is associated with a respective screenshot, a respective test script, and a respective stack trace, and wherein each of the plurality of points is configured to generate a display of associated information when selected via an input request, wherein the associated information comprises at least one of the corresponding snapshot, the respective screenshot, the respective test script, and the respective stack trace.

15. A system comprising:
    a processor; and
    a computer-readable storage medium having stored therein instructions which, when executed by the processor, cause the processor to perform operations comprising:
        based on a user input, determining a snapshot of an automated test executed for a graphical user interface application, wherein the snapshot of the automated test is captured in response to a triggering event comprising a failure of the graphical user interface application;
        determining testing state information associated with the snapshot, wherein the testing state information corresponds to a point in time within an execution time of the automated test, wherein the testing state information comprises a reference to an associated screenshot, an indication of the point in time, a stack trace associated with the automated test, and an indication of a command in a test script executed at the point in time that caused the failure of the graphical user interface application, wherein the test script simulates user input to the graphical user interface application; and
        presenting, on a graphical user interface of the system, a view of a test log associated with the automated test, wherein the view comprises a screenshot area displaying the associated screenshot, a stack trace area displaying methods executed as part of the stack trace associated with the automated test and a location of the methods within the graphical user interface application associated with the automated test, a timing area indicating the point in time, and a test script area displaying the test script and highlighting the test script command executed at the point in time that caused the failure of the graphical user interface application, wherein the test script command simulates a particular user input to the graphical user interface application.

16. The method of claim 1, wherein the view further comprises a timeline representing a plurality of points in time within an execution of the automated test, wherein each of the plurality of points is associated with a corresponding snapshot.

17. The method of claim 16, wherein each of the plurality of points is associated with a respective screenshot, a respective test script, and a respective stack trace.

18. The method of claim 17, wherein each of the plurality of points is configured to generate a display of associated information when selected via an input request, wherein the associated information comprises at least one of the corresponding snapshot, the respective screenshot, the respective test script, and the respective stack trace.

19. The system of claim 15, wherein the view further comprises a timeline representing a plurality of points in time within an execution of the automated test, wherein each of the plurality of points is associated with a corresponding snapshot.

20. The system of claim 19, wherein each of the plurality of points is associated with a respective screenshot, a respective test script, and a respective stack trace, and wherein each of the plurality of points is configured to generate a display of associated information when selected via an input request, wherein the associated information comprises at least one of the corresponding snapshot, the respective screenshot, the respective test script, and the respective stack trace.

* * * * *